(12) United States Patent
Ju et al.

(10) Patent No.: US 11,418,328 B2
(45) Date of Patent: Aug. 16, 2022

(54) SYSTEM FOR KEY CONTROL FOR IN-VEHICLE NETWORK

(71) Applicant: Electronics and Telecommunications Research Institute, Daejeon (KR)

(72) Inventors: Hong Il Ju, Daejeon (KR); Dae Won Kim, Daejeon (KR); Jin Yong Lee, Daejeon (KR); Boo Sun Jeon, Daejeon (KR); Bo Heung Chung, Daejeon (KR); Byeong Cheol Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 286 days.

(21) Appl. No.: 16/695,962

(22) Filed: Nov. 26, 2019

(65) Prior Publication Data

US 2020/0169392 A1 May 28, 2020

(30) Foreign Application Priority Data

Nov. 26, 2018 (KR) ........................ 10-2018-0147308

(51) Int. Cl.
*H04L 9/08* (2006.01)
*H04W 4/48* (2018.01)

(52) U.S. Cl.
CPC ............ *H04L 9/085* (2013.01); *H04L 9/0847* (2013.01); *H04W 4/48* (2018.02)

(58) Field of Classification Search
CPC ... H04L 9/085; H04L 9/0847; H04L 2209/84; H04L 9/0819; H04L 9/0872; H04L 9/0891; H04L 9/0866; H04L 9/0822; H04W 4/48; H04W 4/06; H04W 4/12; H04W 4/46; H04W 4/70
See application file for complete search history.

(56) References Cited

U.S. PATENT DOCUMENTS

| | | | |
|---|---|---|---|
| 9,118,568 B2 | 8/2015 | Hwang et al. | |
| 2013/0160086 A1* | 6/2013 | Katar | H04L 63/08 726/4 |
| 2013/0322449 A1 | 12/2013 | Hwang et al. | |
| 2014/0114497 A1* | 4/2014 | Miyake | H04L 9/3271 701/1 |
| 2015/0089236 A1* | 3/2015 | Han | H04W 12/10 713/181 |
| 2019/0028448 A1* | 1/2019 | Farrell | H04L 9/0822 |

(Continued)

FOREIGN PATENT DOCUMENTS

| | | |
|---|---|---|
| KR | 2003-0022568 A | 3/2003 |
| KR | 10-1620954 B1 | 5/2016 |

(Continued)

*Primary Examiner* — Matthew Smithers
(74) *Attorney, Agent, or Firm* — NSIP Law

(57) ABSTRACT

Disclosed is a system for performing key management of an in-vehicle network. The key management system of the in-vehicle network includes a reception unit configured to receive a shared secret key of a central gateway and a domain gateway, a memory configured to store a program for performing key management of the in-vehicle network using the shared secret key, and a processor configured to execute the program. The processor generates a secret key to be stored in a node of the in-vehicle network using the shared secret key and a unique ID of the node.

13 Claims, 6 Drawing Sheets

(56) References Cited

U.S. PATENT DOCUMENTS

2019/0387558 A1\* 12/2019 Cao ....................... H04L 9/0833
2020/0389325 A1\* 12/2020 Nakajima ............. H04L 9/3242
2021/0111874 A1\* 4/2021 Tanji ................... H04L 63/0435

FOREIGN PATENT DOCUMENTS

KR          10-1714770 B1     3/2017
WO     WO 2018/189885 A1    10/2018

\* cited by examiner

SYSTEM FOR KEY CONTROL FOR IN-VEHICLE NETWORK

CROSS-REFERENCE TO RELATED APPLICATION

This application claims priority to and the benefit of Korean Patent Application No. 10-2018-0147308, filed on Nov. 26, 2018, the disclosure of which is incorporated herein by reference in its entirety.

BACKGROUND

1. Field of the Invention

The present invention relates to a system for performing key management of an in-vehicle network.

2. Discussion of Related Art

Recently, since new vehicle-related services such as autonomous driving service, connected car service, and the like have emerged, and also the amount of data transmitted is gradually increasing, vehicular Ethernet has been introduced into a vehicle network.

However, even when the Ethernet has been introduced into an in-vehicle network, it is difficult for an Ethernet network to replace all conventional legacy networks provided therein. Thus, legacy networks and an automotive Ethernet network are used together to constitute an in-vehicle network. In this case, security vulnerabilities of legacy networks affect the safety of the entire vehicle network.

SUMMARY OF THE INVENTION

The present invention has been proposed to solve the above problems and is directed to providing a key management system of an in-vehicle network to perform management of keys used for security functionality and data confidentiality.

According to an aspect of the present invention, there is provided a key management system of an in-vehicle network, the key management system including a reception unit configured to receive a shared secret key of a central gateway and a domain gateway, a memory configured to store a program for performing key management of the in-vehicle network using the shared secret key, and a processor configured to execute the program. The processor generates a secret key to be stored in a node of the in-vehicle network using the shared secret key and a unique ID of the node.

According to another aspect of the present invention, there is provided a key management system of an in-vehicle network, the key management system including a central gateway configured to generate a master key, a domain gateway configured to receive a shared secret key from the central gateway and generate a secret key to be stored in nodes constituting the in-vehicle network, and a node connected to the domain gateway over a legacy network or an Ethernet network.

DETAILED DESCRIPTION OF EXEMPLARY EMBODIMENTS

Figure 1:
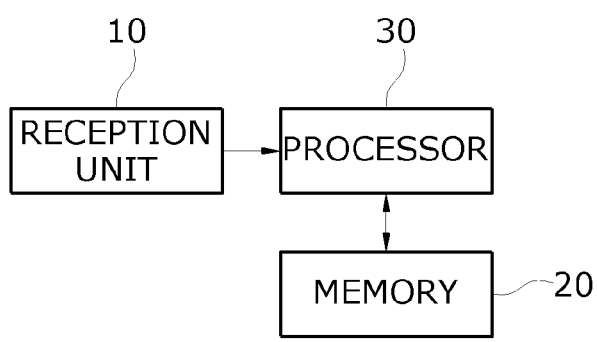
FIG. 1 is a block diagram showing a key management system of an in-vehicle network according to an embodiment of the present invention.

These and other objects, advantages and features of the present invention, and implementation methods thereof will be clarified through the following embodiments described with reference to the accompanying drawings.

The present invention may, however, be embodied in different forms and should not be construed as limited to the embodiments set forth herein. Rather, these embodiments are provided so that this disclosure will fully convey the objects, configurations, and effects of the present invention to those skilled in the art. The scope of the present invention is defined solely by the appended claims.

The terminology used herein is for the purpose of describing particular embodiments only and is not intended to be limiting of the invention. As used herein, the singular forms "a," "an," and "the" are intended to include the plural forms as well, unless the context clearly indicates otherwise. The terms "comprises" and/or "comprising," when used in this specification, specify the presence of stated elements, steps, operations, and/or components, but do not preclude the presence or addition of one or more other elements, steps, operations, and/or components.

Hereinafter, in order to help those skilled in the art to understand the present invention, the background of the present invention will be described first, and then the embodiments of the present invention will be described.

Vehicles have the uniqueness of a closed environment, and thus vehicle networks according to the related art have been designed and applied without considering security.

Recently, however, an Internet of Things (IoT) environment in which all things are connected to each other over the Internet, vehicles have a communication interface to communicate with the outside.

That is, the number of external vehicle interfaces including vehicle-to-vehicle (V2V) communication and vehicle-to-infrastructure (V2I) communication, in addition to a mobile terminal such as a smartphone, increases, and thus a vehicle network becomes increasingly vulnerable in terms of security and becomes a target for hackers.

In addition, as the security threat to an external vehicle interface increases, the security threat to an in-vehicle network is increasing.

A vehicular legacy network is designed, from the beginning, without considering security and thus has a limitation when various conventional security functions applicable to in the information technology (IT) field are applied thereto.

For this reason, conventional vehicle network-based security solutions are mostly dedicated security technologies that consider only legacy communication networks. Therefore, the conventional legacy network-based vehicle security solution can protect one-way data transmission but has a limitation in that accuracy cannot be guaranteed for a sender.

Also, Controller Area Network (CAN), Local Interconnect Network (LIN), and the like conform to a simple message frame-based broadcast manner, which is vulnerable to eavesdropping, denial of service, false message transmission, and non-repudiation attacks.

Also, there is safety vulnerability due to the lack of electronic control unit (ECU) authentication and authority control. When an attacker controls only a single ECU in a vehicle over a network, the attacker can secure complete control of other ECUs of the vehicle.

According to the related art, only domains having the same network scheme are provided with a security function. This is nothing more than protection or countermeasure based on a single domain that cannot be associated with other domains. Therefore, when heterogeneous networks are interworking, there is a problem in that the accuracy of ECUs and the verification of whether messages are normal are insufficient during transmission process.

Even when the Ethernet has been introduced into an in-vehicle network, it is difficult for an Ethernet network to replace all conventional legacy networks provided therein. Therefore, conventional legacy networks and an automotive Ethernet network are used together to constitute an in-vehicle network.

In this case, the security vulnerability of the legacy network may affect the safety of the entire vehicle network.

For example, a CAN network, which is one legacy network, is designed such that a transmitted message does not contain information regarding a transmission node or a reception node and a device (ECU) capable of performing CAN_ID according to the priority of the corresponding CAN_ID is executed.

Accordingly, in an In-Vehicle Networking (IVN) consisting of only conventional CAN networks, a corresponding ECU is executed with CAN_ID determined in advance (upon vehicle release), and attack attempts and damages are concerned due to the exposure of CAN_ID.

Communication between ECUs in a vehicle requires different communication methods depending on functionality, and thus different security functions are applied to the communication.

In general, confidentiality, integrity, and message authentication for communication messages are default security functions. In order to perform these security functions, it is most important to manage keys, such as an encryption key and an authentication key, which are used for data confidentiality.

Temporal constraints are very important for vehicles, unlike embedded systems such as conventional personal computers (PCs) or mobile terminals.

That is, when limited hardware resources are provided, symmetric key encryption algorithms are much more advantageous than public key encryption algorithms, and it is advantageous to use a fast and lightweight encryption algorithm if possible.

However, in order to use symmetric key encryption algorithms, a problem related to key management must be solved first.

The present invention has been proposed to solve the above-described problems and provides an efficient key management method necessary to apply a security function in an in-vehicle network composed of a conventional legacy network and an Ethernet network.

According to an embodiment of the present invention, the present invention provides a method of safely and efficiently sharing a secret key and managing a key using the secret key over a network connected to an electronic control device that uses a legacy network.

According to an embodiment of the present invention, it is possible to minimize a security function performed by a domain gateway and a vehicular electronic control device having limited resources to enable safe and efficient key management.

According to an embodiment of the present invention, by solving a problem of a sender and receiver of a message not being confirmed in a legacy network and also by enabling devices (ECUs) connected to the same legacy network to use different secret keys, it is possible to allow safe data transmission.

Also, it is possible to minimize load generated due to a security function for a device (ECU) having a lower specification than a domain gateway.

According to an embodiment of the present invention, it is possible to guarantee message integrity, message authentication, and message confidentiality using an encryption algorithm that supports message authentication and confidentiality using symmetric key cryptography.

FIG. 1 is a block diagram showing a key management system of an in-vehicle network according to an embodiment of the present invention.

The key management system of an in-vehicle network according to an embodiment of the present invention includes a reception unit 10 configured to receive a shared secret key of a central gateway and a domain gateway, a memory 20 configured to store a program for performing key management of the in-vehicle network using the shared secret key, and a processor 30 configured to execute the program. The processor 30 generates a secret key to be stored in a node of the in-vehicle network using the shared secret key and a unique ID of the node.

According to an embodiment of the present invention, the shared secret key is generated using a master key of the central gateway and a unique ID of the domain gateway.

The processor 30 according to an embodiment of the present invention issues a temporary message ID to perform communication during a registration or update process of the node, and generates the temporary message ID using registration or update time information.

The processor 30 generates an encryption/decryption key using the time information, the shared secret key, and the unique ID of the node, encrypts the temporary message ID using the generated encryption/decryption key, and transmits the encrypted temporary message ID to the node.

The processor 30 encrypts a message ID to be processed by the node, node ID information matching the message ID, and time required for registration or update of the node using the encryption/decryption key and transmits the encrypted result to the node.

The node generates the encryption/decryption key using the temporary message ID, the unique ID of the node, and time at which registration or update is complete.

Figure 2:
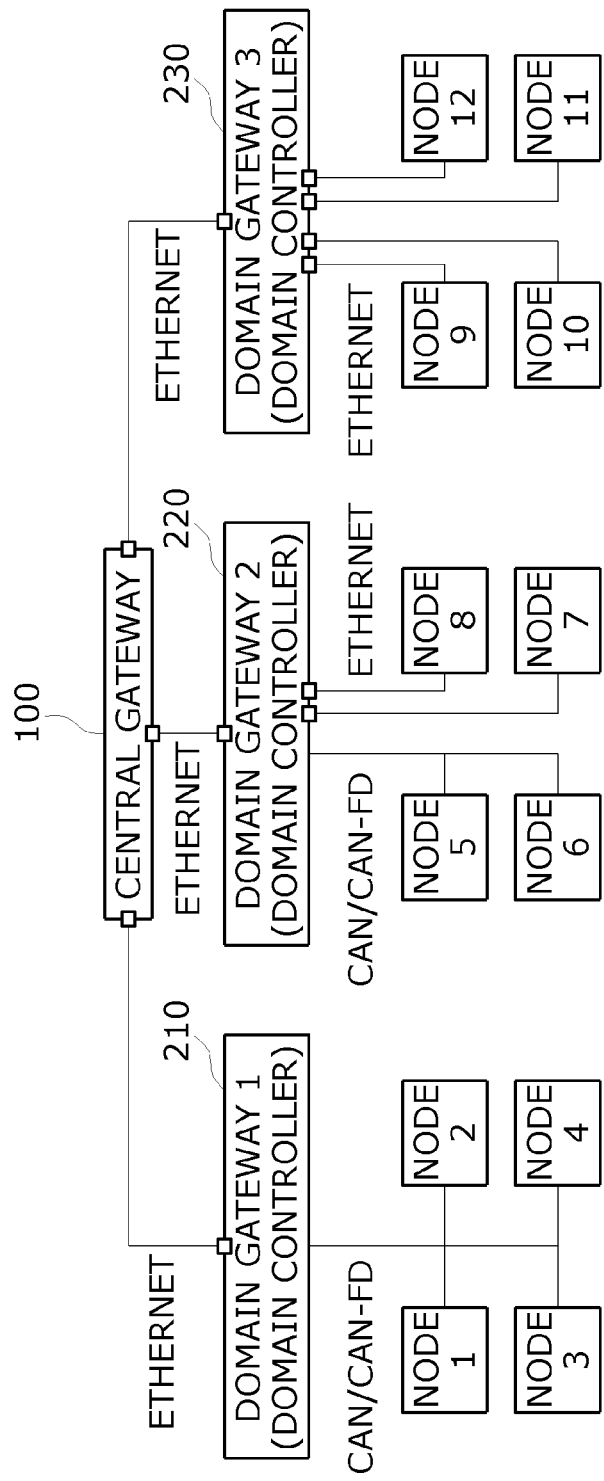
FIG. 2 shows an environment in which a key management system of an in-vehicle network is applied according to an embodiment of the present invention, and also shows a vehicle network configuration diagram in relation to an environment in which a conventional legacy network and an automotive Ethernet network are used together.

FIG. 2 shows an environment in which a key management system of an in-vehicle network is applied according to an embodiment of the present invention, and also shows a vehicle network configuration diagram in relation to an environment in which a conventional legacy network and an automotive Ethernet network are used together.

The key management system of the in-vehicle network according to an embodiment of the present invention includes a domain gateway 210 including only a legacy network that uses CAN/CAN-FD including a central gateway 100, a domain gateway 220 including an Ethernet network in addition to the legacy network, and a domain gateway 230 including only an Ethernet network which are configured with respect to the central gateway 100.

The domain gateway 210 including only the legacy network shown in FIG. 2 is likely to continue to use a conventional network with verified safety for an engine, a brake, and the like associated with safety.

That is, as shown in FIG. 2, an automotive Ethernet network that has been recently introduced is unlikely to replace all the conventional legacy networks.

In the Ethernet network shown in FIG. 2, a sender who sends a message may be confirmed, and various security functions used in conventional Ethernet networks are applicable. However, there is a need for a solution to solve the security problems of conventional legacy networks.

Figure 3:
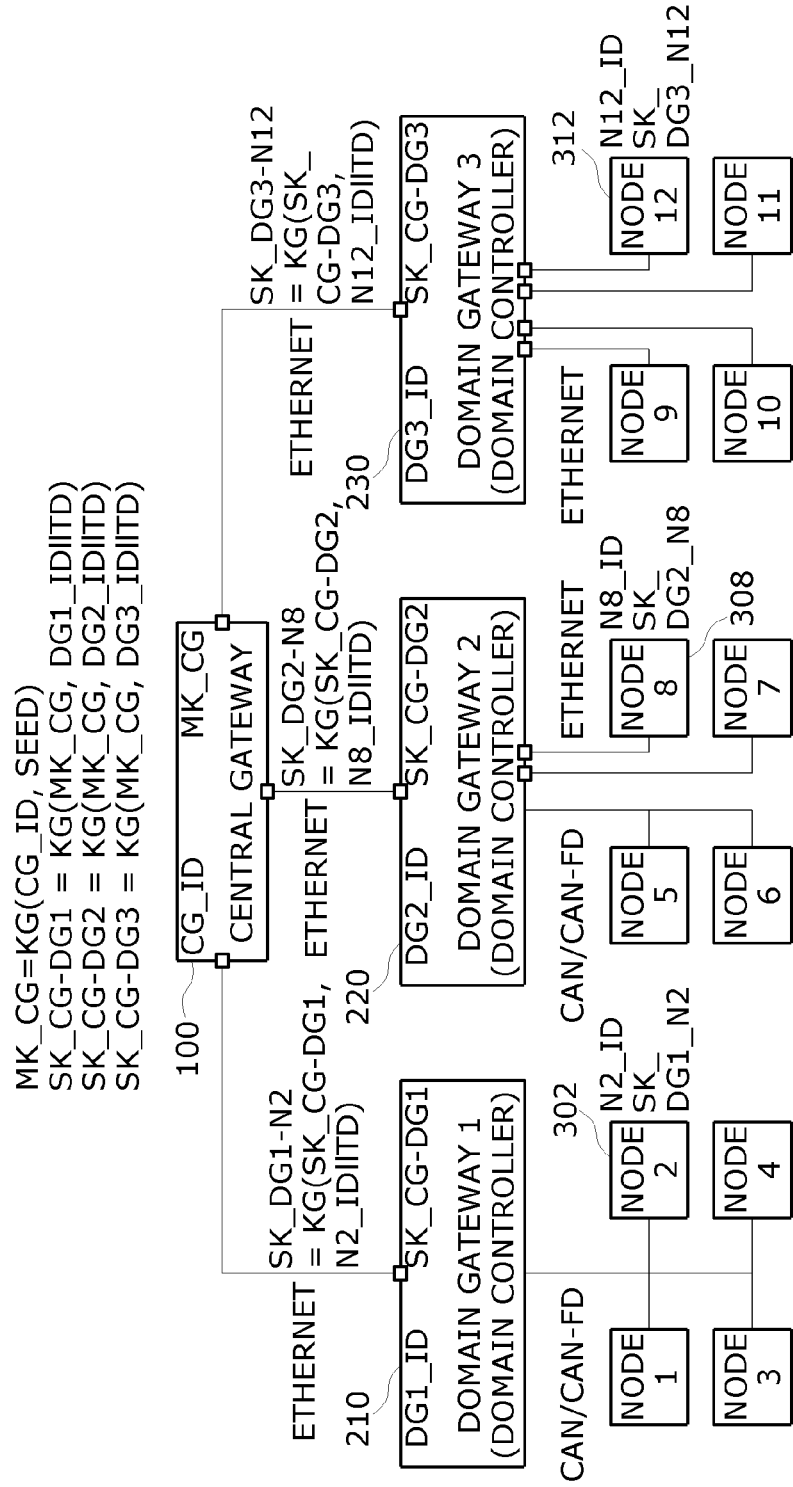
FIG. 3 is a block diagram showing a key management system of an in-vehicle network according to an embodiment of the present invention.

FIG. 3 is a block diagram showing a key management system of an in-vehicle network according to an embodiment of the present invention.

FIG. 3 shows a mechanism associated with the generation and storage of key values needed for key management of an in-vehicle network according to an embodiment of the present invention.

The central gateway CG 100 is connected to a first domain gateway DG1 210, a second domain gateway DG2 220, and a third domain gateway DG3 230.

To help those skilled in the art to better understand the present invention, only three domain gateways are shown depending on a network configuration aspect. Actually, depending on the configuration, another domain gateway may be added, or the in-vehicle network may be configured in another method.

The central gateway 100 configures a root key for key management, and generates a master key MK_CG using its own unique ID information and unique seed value as an input and safely stores the master key MK_CG.

The central gateway 100 generates secret keys SK_CG-DG1, SK_CG-DG2, and SK_CG-DG3 to be shared with the domain gateways 210, 220, and 230 on the basis of the master key and safely stores the secret keys in the domain gateways 210, 220, and 230.

The secret keys to be stored in domains are generated by means of a key generation function that uses unique ID information of the domain gateways 210, 220, and 230 and the master key of the central gateway 100 as an input.

Each of the domain gateways 210, 220, and 230 generates a secret key SK_DG-Node to be shared with each node connected to its own domain and safely stores the secret key in the corresponding node.

The secret keys to be stored in the nodes are generated by means of a key generation function that uses unique ID information of the nodes and the secret keys SK_CG-DG shared between the central gateway 100 and the domain gateways 210, 220, and 230 as an input.

That above process is a preliminary work in a vehicle manufacturing process, which is performed before a vehicle is delivered to a customer.

Figure 4:
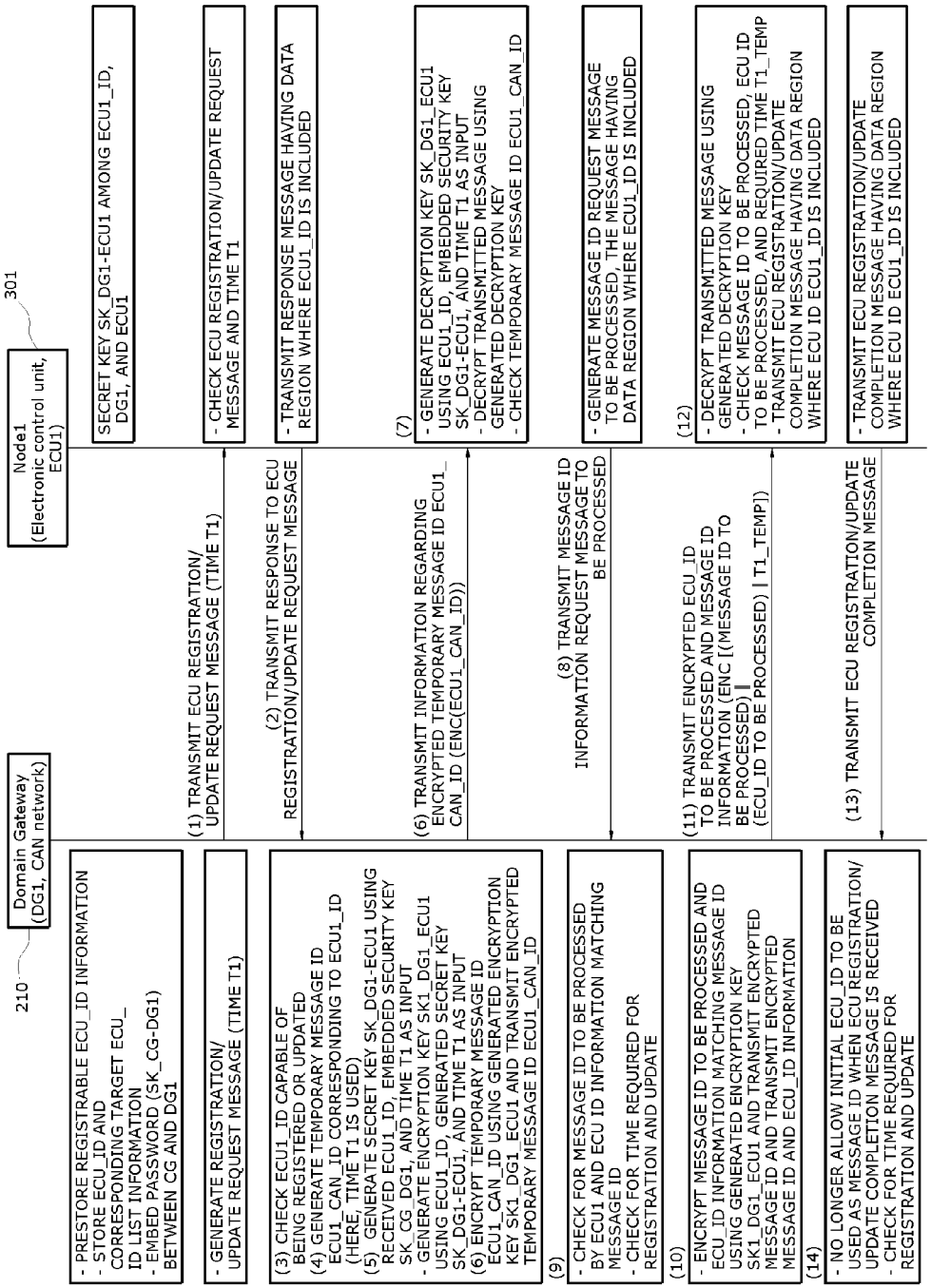
FIG. 4 shows a communication process between a domain gateway and a first node according to an embodiment of the present invention.

FIG. 4 shows a communication process between the domain gateway 210 and a first node 301 according to an embodiment of the present invention.

As described above with reference to FIG. 3, an initial secret key is generated and stored in each device constituting the vehicle network. In particular, FIG. 4 shows a process of each node safely sharing a key, focusing on the domain gateway 210 including only the legacy network.

In order to help those skilled in the art to understand the present invention, a node will be depicted as an electronic control unit (ECU) in the following description.

In FIG. 4, the first domain gateway DG1 210 includes only a CAN network and prestores a secret key SK_CG-DG1 shared between the central gateway 100 and the first domain gateway 210, registrable ECU_ID list information, and ECU_ID information to be processed by each node ECU.

Also, a first node ECU1 301 needs to prestore unique information ECU1_ID of the first node and a secret key SK_DG1-ECU1 shared between the first domain gateway DG1 210 and the first node ECU1 301.

Before a vehicle is released, the first node ECU1 301 needs to be registered with the first domain gateway DG1 210 once at the first time. After the registration, update is performed whenever the vehicle is started or at preset intervals.

According to an embodiment of the present invention, messages used during an ECU registration or update process are defined with a separate message ID such that all the nodes ECU process the ECU registration or update messages.

Also, only an ECU registration or update-associated message ID is performed during the ECU registration or update process. When a vehicle is started, the domain gateway transmits an ECU registration or update request message, and each of the nodes ECU may sequentially perform communication using a temporary message ID through the registration or update process.

The process shown in FIG. 4 will be described in detail as follows.

(1) The first domain gateway DG1 210 transmits an ECU registration or update request message including information regarding time at which the current vehicle is started (a registration or update request message generation time T1) to any nodes ECU in a broadcast manner.

(2) When the ECU registration or update request message is received, the first node ECU1 301 transmits a response message for the ECU registration or update request, the response message having a data region where ECU1_ID, which is unique information of the first node 301, is included.

(3) When the response message is received, the first domain gateway DG1 210 may check whether it is possible to register or update received ECU1_ID.

(4) When received ECU1_ID is confirmed as indicating an ECU capable of being registered/updated, the first domain gateway DG1 210 generates a temporary message ID ECU1_CAN_ID corresponding to ECU1_ID.

When the temporary message ID ECU1_CAN_ID is generated, the first domain gateway DG1 210 may use the current registration or update time T1.

Here, for the registration or update time T1, an update interval may be used as an update interval such as whenever a vehicle is started, daily, weekly, or every several hours.

(5) The first domain gateway DG1 210 generates the temporary message ID ECU1_CAN_ID corresponding to received ECU1_ID using the time information T1. Subsequently, in order to safely transmit the temporary message ID ECU1_CAN_ID to the first node ECU1 301, the first domain gateway DG1 210 generates a secret key SK_DG1-ECU1 shared between the first domain gateway DG1 210 and the first node ECU1 301 using received ECU_1D and an embedded secret key SK_CG-DG1 shared between the central gateway CG100 and the first domain gateway DG1 210. Also, the first domain gateway DG1 210 generates an encryption key SK1_DG1-ECU1, which is a new session key shared with the first node ECU1 301, by using received ECU1_ID, the encryption key SK_DG1-ECU, and the time information T1 as an input. The new session key, that is, the encryption key SK1_DG1-ECU1 is induced and generated from an old secret key for the purpose of use while a session is maintained for security. If necessary, without generating the secret key, which is a new session key, the pre-generated secret key SK_DG1-ECU1 shared between the first domain gateway DG1 210 and the first node ECU1 301 may be used as the encryption key.

(6) The first domain gateway DG1 210 encrypts the temporary message ID ECU1_CAN_ID using the generated encryption key SK_DG1-ECU1 and transmits the encrypted temporary message ID to the first node ECU1 301.

(7) When the encrypted temporary message ID is received, the first node ECU1 301 generates the decryption key SK1_DG1_ECU1 using ECU1_ID, the prestored secret key SK_DG1-ECU1 shared between the first domain gateway 210 and the first node 301, and the time information T1. The first node ECU1 301 decrypts the transmitted message with the generated decryption key SK1_DG1_ECU1 and checks the temporary message ID ECU1_CAN_ID. In this case, when the pre-generated secret key SK_DG1-ECU1 shared between the first domain gateway DG1 210 and the first node ECU1 301 is used as the encryption key without generating the encryption key SK1_DG1-ECU1, which is a new session key in above (5), the pre-embedded secret key SK_DG1-ECU1 may also be used as the decryption key without generating the decryption key SK1_DG1_ECU1, which is a new session key, in (7).

(8) The first node ECU1 301 transmits a request message for a message ID to be received and processed.

In this case, the first node ECU1 301 transmits a message having a data region where ECU1_ID, which is unique information of the first node ECU1 301, is included.

(9) The first domain gateway DG1 210 checks transmitted ECU1_ID and checks a message ID to be processed by the first node ECU1 301 and information regarding an ECU ID that matches the message ID and that is to be processed.

In this case, when the checking is complete, the first domain gateway DG1 210 checks information regarding time T1_temp required to complete registration or update.

(10) The first domain gateway DG1 210 encrypts the message ID to be processed by the first node ECU1 301, the information regarding the ECU ID that matches the message ID and that is to be processed, and the information regarding the time T1_temp required to complete the registration or update using the encryption/decryption key SK1_DG1_ECU1 obtained in the above process.

(11) The first domain gateway DG1 210 may transmit the encrypted message to the first node ECU1 301.

(12) The first node ECU1 301 decrypts the transmitted message using the decryption key SK1_DG1-ECU1 and checks the message ID to be processed, the ECU ID to be processed, and the information regarding the required time T1_temp.

(13) The first node ECU1 301 transmits an ECU registration or update completion message having a data region where ECU_ID is included.

(14) When the ECU registration or update completion message is received, the first domain gateway DG1 210 no longer allows the initial ECU_ID to be used as the message ID, and performs message transmission/reception using the temporary message ID ECU1_CAN_ID corresponding to ECU1_ID capable of transmitting or receiving messages.

The above process is a process of issuing a temporary message ID for the purpose of the security of the message ID with respect to the first node ECU1 301. Thus, it is possible to decrease security threats even when a message ID is exposed during a message transmission process.

That is, when a vehicle is started next time, the above process is performed, and thus a new temporary message ID is used.

Also, while performing the process shown in FIG. 4, the first domain gateway DG1 210 generates and uses an encryption/decryption key for the first node ECU1 301 at every time, rather than storing the encryption/decryption key.

The number of nodes ECU connected to the first domain gateway DG1 210 may be up to several tens. According to an embodiment of the present invention, unlike the related art, it is not necessary to store and manage any encryption/decryption keys for corresponding nodes, and also it is possible to minimize load because nodes ECU having lower specification than the first domain gateway DG1 210 do not need any encryption process.

Figure 5:
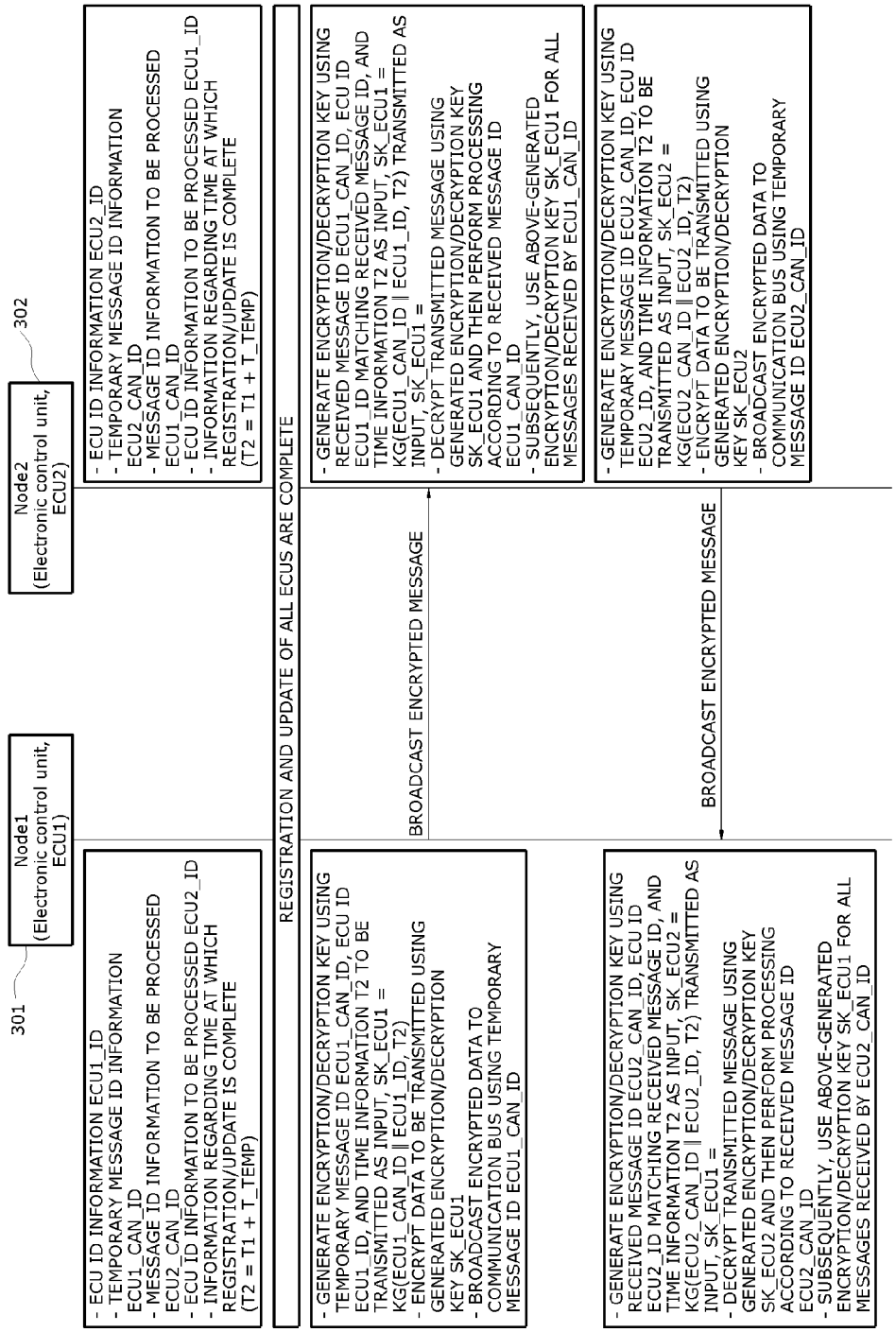
FIG. 5 shows a communication process between a first node and a second node according to an embodiment of the present invention.

FIG. 5 shows a communication process between a first node and a second node according to an embodiment of the present invention.

This is a process after the registration or update of all nodes ECU registered in the domain gateway is complete. FIG. 5 shows a message transmission process that uses a temporary message ID instead of ECU_ID.

In particular, FIG. 5 shows a process for message transmission between the first node ECU1 301 and the second node ECU2 302, both of which are connected to the first domain gateway DG1 210.

When the ECU registration or update described above with reference to FIG. 4 is complete, information regarding its own ECU ID is prestored, and information regarding a temporary message ID to be used, information regarding a message ID to be processed, information regarding an ECU ID to be mapped and processed, information regarding time T2 at which the registration or update is complete, and the like are further stored.

In this case, there may be a plurality of pieces of message ID information to be processed and a plurality of pieces of ECU ID information to be mapped and processed depending on the function of the node ECU.

A case in which the first node ECU1 301 transmits data using its own temporary message ID will be described below with reference to FIG. 5.

The first node ECU1 301 generates an encryption/decryption key SK_ECU1 through a key generation function using its own temporary message ID ECU1_CAN_ID, its own ECU ID ECU1_ID, and time information T2 as an input.

The first node ECU1 301 encrypts data to be transmitted using the generated encryption/decryption key SK_ECU1 and transmits the encrypted data to a communication bus in a broadcast manner by using its own temporary message ID ECU1_CAN_ID.

The first node ECU1 301 encrypts all messages transmitted to ECU1_CAN_ID using the encryption/decryption key SK_ECU1.

The second node ECU2 302, which performs a message ID "ECU1_CAN_ID" among the nodes connected to the bus, receives a message and checks whether the message has a message ID to be processed.

In this case, the second node ECU2 302 generates the encryption/decryption key SK_ECU1 using the received message ID ECU1_CAN_ID, an ECU ID ECU1_ID matching the received message ID, and time information T2 as an input.

The second node ECU2 302 decrypts the transmitted message using the generated encryption/decryption key SK_ECU1 and performs processing according to the received message ID ECU1_CAN_ID.

The second node ECU2 302 decrypts all messages received by ECU1_CAN_ID using the encryption/decryption key SK_ECU1.

A process in which the second node ECU2 302 transmits data using its own temporary message ID will be described below with reference to FIG. 5.

The second node ECU2 302 generates an encryption/decryption key SK_ECU2 through a key generation function using its own temporary message ID ECU2_CAN_ID, its own ECU ID ECU2_ID, and time information T2 as an input.

The second node ECU2 302 encrypts data to be transmitted using the generated encryption/decryption key SK_ECU2 and transmits the encrypted data to a communication bus in a broadcast manner by using its own temporary message ID ECU2_CAN_ID.

The second node ECU2 302 encrypts all messages transmitted to ECU2_CAN_ID using the encryption/decryption key SK_ECU2.

Then, the first node ECU1 301, which performs a message ID "ECU2_CAN_ID" among the nodes connected to the bus, receives a message and checks whether the message has a message ID to be processed.

In this case, the first node ECU1 301 generates the encryption/decryption key SK_ECU2 using the received message ID ECU2_CAN_ID, an ECU ID ECU2_ID matching the received message ID, and time information T2 as an input.

The first node ECU1 301 decrypts the transmitted message using the generated encryption/decryption key SK_ECU2 and performs processing according to the received message ID ECU2_CAN_ID.

Subsequently, the first node ECU1 301 decrypts all messages received by ECU2_CAN_ID using the encryption/decryption key SK_ECU2.

According to an embodiment of the present invention, the encryption/decryption key used while messages are transmitted between the first node ECU1 301 and the second node ECU2 302 is different from an encryption/decryption key used when a message is transmitted between the first node ECU1 301 and the third node ECU3 303.

Also, the encryption/decryption key used while messages are transmitted between the first node ECU1 301 and the third node ECU3 303 is different from an encryption/decryption key used when a message is transmitted between the second node ECU2 302 and the third node ECU3 303.

That is, according to an embodiment of the present invention, all the nodes connected to the domain gateway DG do not perform data encryption using the same secret key, and each node transmitting and receiving a message uses a different encryption/decryption key. Thus, even when secret key information is exposed in one data communication, it is still possible to ensure safety in communication between the other nodes.

Figure 6:
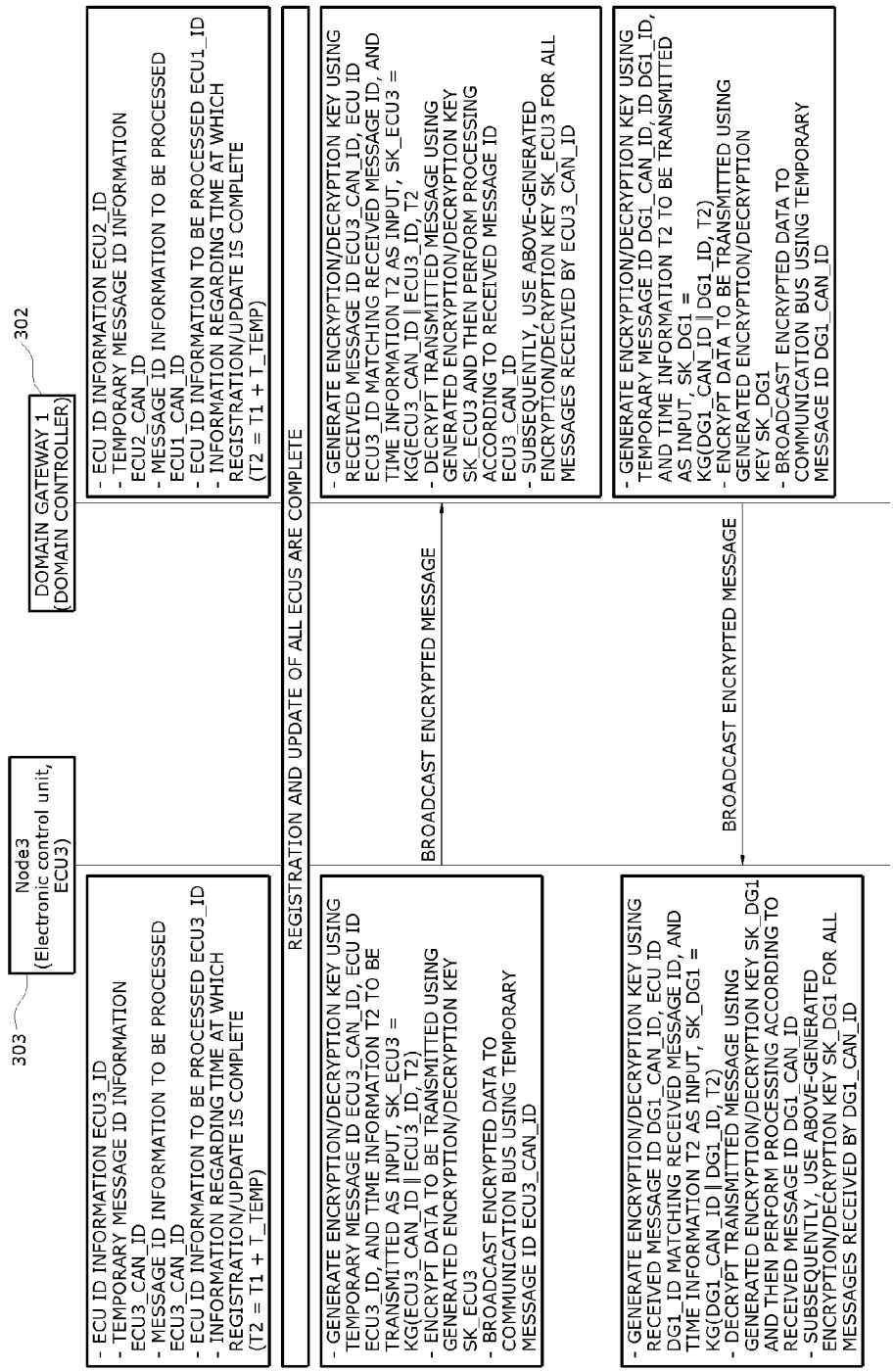
FIG. 6 shows a communication process between a third node and a domain gateway according to an embodiment of the present invention.

FIG. 6 shows a communication process between a third node and a domain gateway according to an embodiment of the present invention.

FIG. 6 shows a process in which a message is transmitted using a temporary message ID instead of ECU_ID after the registration or update of all nodes ECU registered in a domain gateway is complete.

In particular, FIG. 6 shows a process for message transmission between the first domain gateway DG1 210 and the third node ECU3 303 connected to the first domain gateway DG1 210 that has been described with reference to FIG. 5.

The third node ECU3 303 generates an encryption/decryption key SK_ECU3 through a key generation function using its own temporary message ID ECU3_CAN_ID, its own ECU ID ECU3_ID, and time information T2 as an input.

The third node ECU3 303 encrypts data to be transmitted using the generated encryption/decryption key SK_ECU3 and transmits the encrypted data to a communication bus in a broadcast manner by using its own temporary message ID ECU3_CAN_ID.

The third node ECU3 303 encrypts all messages transmitted to ECU3_CAN_ID using the encryption/decryption key SK_ECU3.

The first domain gateway DG1 210, which performs a message ID "ECU3_CAN_ID" among the nodes connected to the bus, receives a message and checks whether the message has a message ID to be processed.

In this case, the first domain gateway DG1 210 generates the encryption/decryption key SK_ECU3 using the received message ID ECU3_CAN_ID, an ECU ID ECU3_ID matching the received message ID, and time information T2 as an input.

The first domain gateway DG1 210 decrypts the transmitted message using the generated encryption/decryption key SK_ECU3 and performs processing according to the received message ID ECU3_CAN_ID.

Subsequently, the first domain gateway DG1 210 decrypts all messages received by ECU3_CAN_ID using the encryption/decryption key SK_ECU3.

A case in which the first domain gateway DG1 210 transmits data using its own temporary message ID will be described below with reference to FIG. 6.

The first domain gateway DG1 210 generates an encryption/decryption key SK_DG1 through a key generation function using its own temporary message ID DG1_CAN_ID, its own ECU ID DG1_ID, and time information T2 as an input.

The first domain gateway DG1 210 encrypts data to be transmitted using the generated encryption/decryption key SK_DG1 and transmits the encrypted data to a communication bus in a broadcast manner using its own temporary message ID DG1_CAN_ID.

Subsequently, the first domain gateway DG1 210 encrypts all messages transmitted to DG1_CAN_ID using the encryption/decryption key SK_DG1.

The third node ECU3 303, which performs a message ID "DG1_CAN_ID" among the nodes connected to the bus, receives a message and checks whether the message has a message ID to be processed.

In this case, the third node ECU3 303 generates the encryption/decryption key SK_DG1 using the received message ID DG1_CAN_ID, an ECU ID DG1_ID matching the received message ID, and time information T2 as an input.

The third node ECU3 303 decrypts the transmitted message using the generated encryption/decryption key SK_DG1 and performs processing according to the received message ID DG1_CAN_ID.

Subsequently, the third node ECU3 303 decrypts all messages received by DG1_CAN_ID using the encryption/decryption key SK_DG1.

According to an embodiment of the present invention, even when a message is transmitted between the third node ECU3 303 and the first domain gateway DG1 210, the first domain gateway DG1 210 is regarded as one node connected to the same bus, and communication is performed in a broadcast manner.

The first domain gateway DG1 210 may deliver a message transmitted from a node connected over a CAN network to another domain gateway using an automotive Ethernet network.

Also, the message delivered to the first domain gateway DG1 210 over the Ethernet network may be transmitted to another node over the CAN network.

Meanwhile, the key management method of the in-vehicle network according to an embodiment of the present invention may be implemented in a computer system or recorded on a recording medium. A computer system may include at least one processor, memory, user input device, data communication bus, user output device, and storage. The above-described elements perform data communication through the data communication bus.

The computer system may further include a network interface coupled to a network. The processor may be a central processing unit (CPU) or a semiconductor device for processing instructions stored in a memory and/or a storage.

The memory and storage may include various types of volatile or non-volatile storage media. For example, the memory may include a read-only memory (ROM) and a random access memory (RAM).

Accordingly, the key management method of the in-vehicle network according to an embodiment of the present invention may be implemented as a computer-executable method. When the key management method of the in-vehicle network according to an embodiment of the present invention is performed by a computer device, computer-readable instructions may implement the key management method according to the present invention.

Meanwhile, the key management method of the in-vehicle network according to the present invention may be embodied as computer-readable codes on a computer-readable recording medium. The computer-readable recording medium includes all types of recording media where data that can be decrypted by a computer system is stored. For example, the computer-readable recording medium may include a ROM, a RAM, a magnetic tape, a magnetic disk, a flash memory, an optical data storage device, and the like. Further, the computer-readable recording media can be stored and carried out as codes that are distributed in a computer system connected to a computer network and are readable in a distributed manner.

According to an embodiment of the present invention, for an in-vehicle network using a legacy network and an automotive Ethernet network together, it is possible to solve a problem of not checking a message sender or receiver in the bus-type legacy network.

According to an embodiment of the present invention, it is possible to block access of unauthorized devices by registering and updating devices (ECU), and it is also possible to prevent subsequent damage even if a message ID and a message are leaked by using a temporary message ID, instead of an initial node ID (ECU_ID, CAN_ID), as a message ID used for communication.

In using a symmetric key encryption algorithm performed during a device (ECU) registration/update process, it is possible to remove a burden of a domain gateway storing and managing secret keys for nodes ECU connected to a domain.

Since a mechanism that does not require an encryption process is applied to nodes ECU having a lower specification than a domain gateway during a device (ECU) registration/update process, it is possible to minimize the load of the nodes ECU having the low specification.

Since even nodes ECU connected to the same domain gateway transmit encrypted data using different secret keys, it is possible to minimize the influence on a node ECU even when a secret key of another node ECU is exposed.

The effects of the present invention are not limited to the aforementioned effects, and other effects not described herein will be clearly understood by those skilled in the art from the above description.

The present invention has been described above with respect to embodiments thereof. Those skilled in the art should understand that various changes in form and details may be made therein without departing from the essential characteristics of the present invention. Therefore, the embodiments described herein should be considered from an illustrative aspect rather than from a restrictive aspect. The scope of the present invention should be defined not by the detailed description but by the appended claims, and all differences falling within a scope equivalent to the claims should be construed as being encompassed by the present invention.

What is claimed is:

1. A key management system of an in-vehicle network, the key management system comprising:
a reception unit configured to receive a shared secret key of a central gateway and a domain gateway;
a memory configured to store a program for performing key management of the in-vehicle network using the shared secret key; and
a processor configured to execute the program,
wherein the processor generates a secret key to be stored in a node of the in-vehicle network using the shared secret key and a unique ID of the node, and
wherein the processor issues a temporary message ID and performs communication during a registration or update process for the node.

2. The key management system of claim 1, wherein the shared secret key is generated using a master key of the central gateway and a unique ID of the domain gateway.

3. The key management system of claim 1, wherein the processor generates the temporary message ID using registration or update time information.

4. The key management system of claim 3, wherein the processor generates an encryption/decryption key using the time information, the shared secret key, and the unique ID of the node, encrypts the temporary message ID using the generated encryption/decryption key, and transmits the encrypted temporary message ID to the node.

5. The key management system of claim 4, wherein the processor encrypts a message ID to be processed by the node, information regarding a node ID matching the message ID, and time required for registration or update of the node using the encryption/decryption key and then transmits the encrypted message ID, node ID information, and required time.

6. The key management system of claim 4, wherein the node generates an encryption/decryption key using the temporary message ID, the unique ID of the node, and information regarding time at which the registration or update is complete.

7. A key management system of an in-vehicle network, the key management system comprising:
- a central gateway configured to generate a master key;
- a domain gateway configured to receive a shared secret key from the central gateway and generate a secret key to be stored in nodes constituting the in-vehicle network; and
- a node connected to the domain gateway over a legacy network or an Ethernet network,
- wherein the domain gateway issues a temporary message ID using registration/update request message generation time information for the node and performs communication using the issued temporary message ID during a registration or update process for the node.

8. The key management system of claim 7, wherein the central gateway generates the shared secret key using unique ID information of the domain gateway and the master key.

9. The key management system of claim 7, wherein the domain gateway generates the secret key using a unique ID of the node and the shared secret key.

10. The key management system of claim 7, wherein the domain gateway generates an encryption/decryption key using the time information, the shared secret key, and a unique ID of the node, encrypts the temporary message ID, and transmits the encrypted temporary message ID to the node.

11. The key management system of claim 10, wherein the node generates a key using the time information, the secret key, and the unique ID of the node and checks the temporary message ID using the generated key.

12. The key management system of claim 10, wherein the domain gateway encrypts a message ID to be processed by the node, information regarding a node ID matching the message ID, and information regarding time required for the registration or update process for the node using the encryption/decryption key and then transmits the encrypted message ID, node ID information, and time information to the node.

13. The key management system of claim 12, wherein the node generates an encryption/decryption key using the temporary message ID, unique ID information of the node matching the temporary message ID, and information regarding time at which the registration or update process is complete and performs inter-node communication.

* * * * *